United States Patent [19]

Williams

[11] Patent Number: 4,819,969
[45] Date of Patent: Apr. 11, 1989

[54] COUPLING DEVICE AND METHOD FOR TUBULAR ELEMENTS

[76] Inventor: Anthony D. Williams, 1011 American St., San Carlos, Calif. 94070

[21] Appl. No.: 179,062

[22] Filed: Apr. 8, 1988

[51] Int. Cl.⁴ .............................................. F16L 25/00
[52] U.S. Cl. .................................... 285/177; 285/332; 285/334.4; 285/399; 29/525; 403/368
[58] Field of Search .................. 285/382, 334.4, 334.2, 285/399, 334.1, 421, 177, 215, 382.1, 382.2; 29/506, 520, 525; 403/368, 374, 314, 409.1

[56] References Cited

U.S. PATENT DOCUMENTS

| | | | |
|---|---|---|---|
| 116,098 | 6/1871 | Reynolds | 285/382 X |
| 2,345,750 | 4/1944 | Hohwart | 403/368 |
| 2,374,284 | 4/1945 | Hall | 285/399 X |
| 3,058,777 | 10/1962 | Froedge | 29/525 |
| 3,269,743 | 8/1966 | Barreca | 29/525 |
| 3,567,257 | 3/1971 | Nowosadko | 285/334.4 |
| 3,797,835 | 3/1974 | Wehner | 285/334.4 X |
| 4,648,632 | 3/1987 | Hagner | 285/334.4 X |

Primary Examiner—Dave W. Arola
Attorney, Agent, or Firm—Flehr, Hohbach, Test, Albritton & Herbert

[57] ABSTRACT

Coupling device and method for joining together tubular elements such as sections of aluminum tubing. The device comprises a coupling sleeve having conically tapered walls of diameters corresponding to the diameters of the tubular elements to be joined together. The tubular elements and the sleeve are pressed together to form a rigid structure in which the tubular elements are aligned axially of each other and the walls of the coupling sleeve are in tight frictional engagement with the walls of the tubular elements.

10 Claims, 2 Drawing Sheets

Fig. 3

| ELEMENT SIZES OD X ID | SMALL END OD X ID | BIG END OD X ID | LENGTH | OUTER WALL ANGLE | INNER WALL ANGLE |
|---|---|---|---|---|---|
| 3.00 x 2.75<br>1.66 x 1.25 | 2.740 x 1.6512 | 2.7669 x 1.663 | 5.375 | .2867° | .1258° |
| 1.66 x 1.25<br>0.75 x 0.584 | 1.374 x .7408 | 1.3903 x .749 | 2.50 | .3750° | .1875° |
| 0.75 x 0.584<br>0.50 x 0.334 | .578 x .4876 | .6028 x .500 | 1.875 | .7586° | .3794° |
| 2.25 x 1.874<br>1.66 x 1.25 | 1.749 x 1.6442 | 2.7669 x 1.663 | 5.375 | .2867° | .1258° |
| 1.05 x 0.850<br>0.75 x 0.584 | .824 x .7325 | .8570 x .749 | 2.50 | .7586° | .3794° |
| 1.05 x 0.850<br>0.50 x 0.334 | .824 x .4939 | .8364 x .500 | 1.875 | .3794° | .1875° |

COUPLING DEVICE AND METHOD FOR TUBULAR ELEMENTS

This invention pertains generally to the coupling of tubular elements, and more particularly to a coupling device and method for joining sections of aluminum tubing together to form the elements of an antenna.

Yagi antennas are employed in radio communications and other situations where signal gain and directivity are desired. Such antennas have a plurality of elongated elements mounted on a longitudinally extending boom, with the elements extending in a lateral direction and being spaced along the boom. For transmitting, at least one of the elements is driven with the signal to be propagated, and the remaining elements serve as directors or reflectors for this signal. For receiving, the received signal is taken from the element(s) which would be driven for transmission.

The lengths of the elements are dependent upon the frequency at which the antenna is designed to operate and the function of the elements. The length of a driven element is generally inversely proportional to the operating frequency of the antenna, a reflector is generally longer than a driven element, and directors are generally shorter than a driven element.

The elements of a Yagi antenna are commonly formed of a relatively lightweight electrically conductive material such as aluminum tubing, with the longer elements comprising a plurality of sections of progressively smaller tubing joined telescopically together. With this construction, it is important that the joints between the sections be strong from a mechanical standpoint and that they provide good electrical conductivity between the sections.

In smaller antennas, the joints between the tubular sections are commonly made by clamping overlapping end portions of the sections together, sometimes with a split in the larger section to permit it to be drawn more tightly against the smaller section. While this technique has been used successively at higher frequencies where the overall lengths of the elements are shorter, it is not satisfactory at lower frequencies where the element lengths may be on the order of 65 feet or more.

Prior to making the present invention, applicant tried a number of techniques for joining aluminum tubing together to make the elements of an antenna. These tests included welding, swedged joints, an electrically conductive adhesive, tapering the end portion of the smaller tubing to provide a tight fit, and bolting the sections together. Elements constructed in accordance with each of these techniques failed in a relatively short time, either because the joints separated or because the tubing broke near the joints.

It is in general an object of the invention to provide a new and improved device and method for joining tubular elements together.

Another object of the invention is to provide a device and method of the above character which overcome the limitations and disadvantages of techniques heretofore employed for joining aluminum tubing together.

Another object of the invention is to provide a device and method of the above character which are particularly suitable for use in the construction of the elongated elements of a Yagi antenna.

These and other objects are achieved in accordance with the invention by providing a coupling sleeve having conically tapered walls with diameters corresponding to the diameters of the tubular elements to be joined together, and pressing the tubular elements and the sleeve together to form a rigid structure in which the tubular elements are aligned axially of each other and the tapered walls of the coupling sleeve are in tight frictional engagement with the walls of the tubular elements.

FIG. 3 is a table of dimensions for coupling sleeves for use with tubular sections for different sizes in the antenna of FIG. 1.

Figure 1:
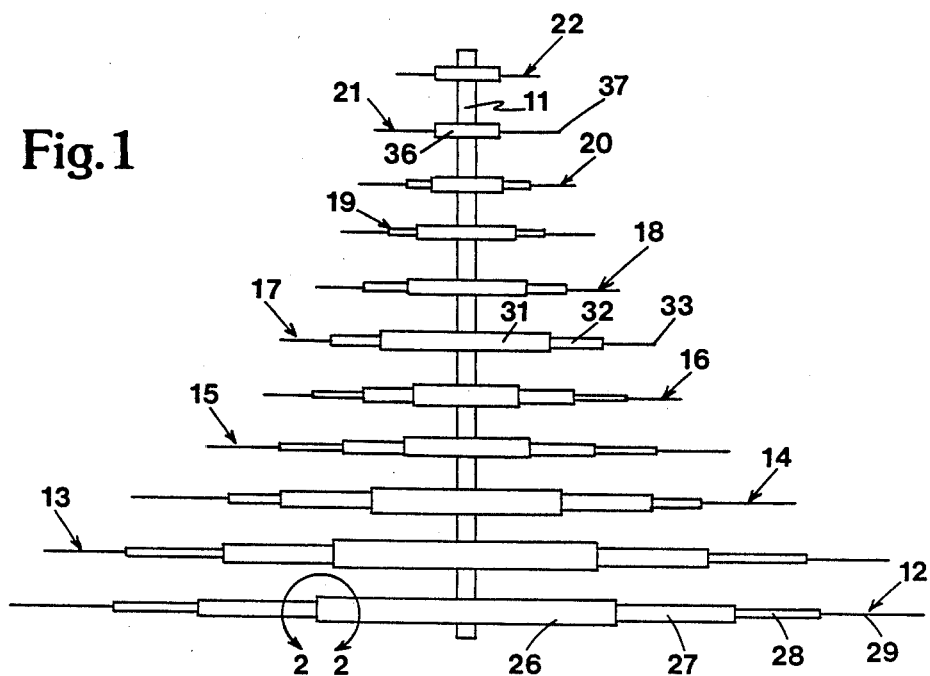
FIG. 1 is a top plan view of one embodiment of an antenna with coupling sleeves according to the invention.

The antenna illustrated in FIG. 1 is a Yagi antenna which has a longitudinally extending boom 11 on which a plurality of elongated elements 12-22 are mounted. The elements extend laterally or crosswise of the boom and are affixed to the boom at their midpoints by suitable means such as clamps, not shown. In the particular antenna which is illustrated, element 12 is a reflector, element 13 is a driven element, and elements 14-22 are directors. As is customary in Yagi antennas, the reflector element is slightly longer than the driven element, and the directors elements decrease in length toward the front of the antenna.

The lengths of the elements are determined by the frequency at which the antenna is to be operated and the gain and directivity characteristics desired. In one embodiment intended for use at relatively low frequencies, the driven element has a length on the order of 63.5 feet, the reflector has a length on the order of 64.25 feet, and the directors have lengths ranging from about 53 feet to about 9.25 feet.

Each of the elements is fabricated of a plurality of sections of aluminum tubing, with the number of sections and the size of the tubing in each element depending upon the length of the element. Reflector element 12, for example, has seven sections of tubing, including a central section 26, with two intermediate sections 27, 28 and an outer section 29 on each side of the central section. The central section has an outer diameter on the order of 3.00 inches, an inner diameter on the order of 2.75 inches, and a length on the order of 144 inches. Intermediate sections 27 each have an outer diameter on the order of 1.66 inch, an inner diameter of 1.25 inch, and a length on the order of 138 inches. Intermediate sections 28 each have an outer diameter of 0.75 inch, and inner diameter of 0.584 inch, and a length on the order of 54 inches. End sections 29 each have an outer diameter of 0.50 inch, an inner diameter of 0.334 inch, and a length on the order of 64 inches.

Driven element 13 and directors 14-16 each have seven sections and are similar in construction to reflector element 12. However, since the director elements are shorter and lighter than the reflector, the central sections of these elements can be shorter and smaller in diameter than the central sections of the longer elements. Thus, in the embodiment illustrated, the central sections of elements 14-16 have an outer diameter of 2.25 inches, an inner diameter of 1.874 inch, and lengths ranging from about 71 inches to about 36 inches. The shortest of these three elements (element 16), for example, has an overall length on the order of 34.5 feet.

Director elements 17-20 each have five sections of tubing. Element 17, for example, has a central section 31, with an intermediate section 32 and an outer section 33 on each side of the central section. The central section has an outer diameter of 1.05 inch, an inner diameter of 0.85 inch, and a length on the order of 62 inches. Intermediate sections 32 are similar in diameter to intermediate sections 28, and sections 32 each have a length on the order of 58 inches. End sections 33 are similar in diameter to end sections 29, and end sections 33 each have a length on the order of 64 inches. Elements 18-20 are of progressively shorter length, and element 20 has an overall length on the order of 8.75 feet.

The two shortest director elements (elements 21 and 22) each have three sections of tubing. Element 21, for example, has a central section 36 and end sections 37. Central section 36 is similar in diameter to central section 31, and end sections 37 are similar in diameter to end sections 29 and 33. Director 22 has an overall length on the order of 7.58 feet.

The sections of tubing which make up each of the elements of the antenna are aligned coaxially of each other, with the adjoining end portions of the sections overlapping each other in telescopic fashion. The sections are secured together by coupling sleeves 39 which are press fit with the overlapping end portions of the tubular sections to provide joints which are both mechanically strong and electrically conductive.

Figure 2:
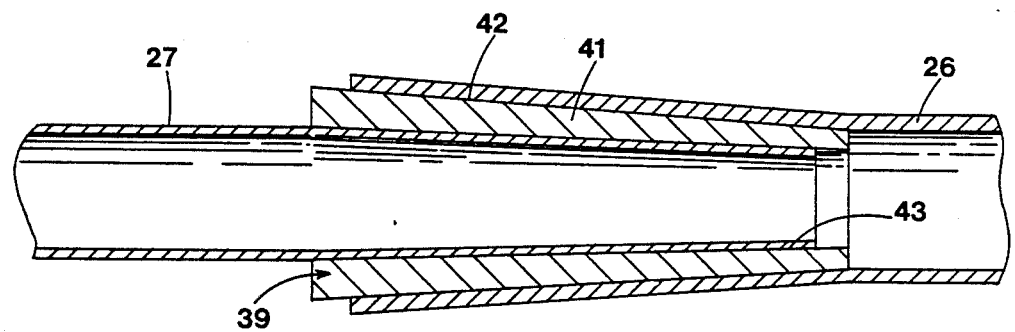
FIG. 2 is an enlarged centerline sectional view of one of the coupling sleeves in the embodiment of FIG. 1.

As illustrated in FIG. 2, each of the coupling sleeves 39 has an axially elongated body 41, with a conically tapered outer wall 42 and a conically tapered inner wall 43 disposed concentrically of each other. The diameter and the angle of taper of outer wall 42 are selected to provide a press fit with the inner wall of the larger tubular section to be joined by the sleeve, and the diameter and the angle of taper of inner wall 43 are selected to provide a press fit with the outer wall of the smaller section of tubing to be joined by the sleeve.

The particular coupling sleeve in shown in FIG. 2 is the one which joins the central section 26 and intermediate section 27 of reflector element 12 together. The dimensions for this sleeve are given in the first line of the table in FIG. 3. Central section 26 has an inner diameter of 2.75 inches, and the coupling sleeve has an outer diameter of 2.74 inches at its small end and an outer diameter of 2.7669 inches at its large end. When the sleeve is pressed into the tubular section, the end portion of the tube is expanded or flared slightly by the sleeve.

Tubing section 27 has an outer diameter of 1.66 inch, and the coupling sleeve has an inner diameter of 1.663 inch at its big end and 1.6512 inch at its small end. When the sleeve is pressed onto the end portion of tubular section 27, the end portion is compressed or tapered slightly.

The coupling sleeve which joins central section 26 and intermediate section 27 together has a length on the order of 5.375 inches, and the sleeve projects about 0.25 inch from the ends of the tubular sections.

It has been found that the best results are obtained when the outer wall of the coupling sleeve has a greater angle of taper than the inner wall of the sleeve. More specifically, it has been found that the angle of taper of the outer wall should be on the order of two times the angle of taper of the inner wall. Thus, for example, in the coupling sleeve which joins central section 26 and intermediate section 27 together, the outer wall has an angle of taper of 0.2867°, and the inner wall has an angle of taper of 0.1258°.

It is also desirable that the coupling sleeve have a sufficient wall thickness to prevent deformation of the sleeve when it is pressed into and onto the elements to be joined together. Thus, for example, the sleeve which joins tubular sections 26 and 27 together has an average wall thickness on the order of 0.545 inch, whereas the tubular sections have a wall thicknesses of 0.125 and 0.205 inch, respectively. The sleeve can be fabricated of the same material as the tubing, e.g. aluminum, or any other suitable material.

The dimensions of the coupling sleeves which join the other sections of tubing together in the antenna of FIG. 1 are given in the table of FIG. 3. All of the dimensions are in units of inches, except the angles which are in degrees.

As noted above, the coupling sleeves and the tubular sections are joined together by press fitting. This is conveniently done by pressing the sleeve into position on the smaller tubing section first, then pressing the sleeve into position within the larger section. This method of assembly has the advantage that the sleeve can be engaged directly by the press at all times, which means that the sleeve can be positioned as desired on the smaller tubular section and then pressed to the desired position within the larger section without disturbing the position of the sleeve on the smaller section. Any other suitable method of assembly can, of course, be employed.

The coupling sleeve and method of the invention have a number of important features and advantages. They provide a secure joint which is both mechanically sound and electrically conductive. The joints are long-lasting and free of the failures which have been encountered with the techniques previously employed for joining antenna sections together. While the sleeve has been disclosed with specific reference to aluminum tubing, it can be employed with other materials as well.

It is apparent from the foregoing that a new and improved coupling device and method for joining tubular elements together have been provided. While only certain presently preferred embodiments have been described in detail, as will be apparent to those familiar with the art, certain changes and modifications can be made without departing from the scope of the invention as defined by the following claims.

I claim:

1. In a device for joining together first and second tubular elements of different diameters: a sleeve having a conically tapered inner wall for press fit engagement with the outer wall of the first tubular element and a conically tapered outer wall for press fit engagement with the inner wall of the second tubular element, the inner wall of the sleeve having an angle of taper less than about 0.40°, and the outer wall having an angle of taper on the order of twice the angle of taper of the inner wall.

2. The device of claim 1 wherein the sleeve has a length on the order of three times the outer diameter of the sleeve.

3. In combination: first and second sections of aluminum tubing aligned coaxially of each other, and a coupling sleeve having a conically tapered walls in press fit engagement with end portions of the sections of aluminum tubing, each said walls having an angle no greater than about 0.80°.

4. In combination of claim 3 wherein the second section of aluminum tubing has a smaller diameter than the first section, an end portion of the second portion extends into an end portion of the first section in overlapping fashion, the outer wall of the coupling sleeve is in press fit engagement with the inner wall of the overlapping end portion of the first section, and the inner wall of the coupling sleeve is in press fit engagement with the outer wall of the overlapping end portion of the second section.

5. The combination of claim 4 wherein the outer wall of the coupling sleeve has a greater angle of taper than the inner wall of the sleeve.

6. The combination of claim 5 wherein the angle of taper of the outer wall is on the order of twice the angle of taper of the inner wall.

7. In a method of joining together first and second tubular elements, the steps of providing a coupling sleeve having conically tapered walls of diameters corresponding to the respective diameters of the first and second tubular elements and angles of taper less than about 0.80°, and pressing the tubular elements and the sleeve together to form a rigid structure in which the tubular elements are aligned axially of each other and tapered walls of the coupling sleeve are in tight press fit engagement with the walls of the respective tubular elements.

8. The method of claim 7 wherein the tubular elements are of different diameters, and the inner wall of the coupling sleeve is pressed into engagement with the outer wall of the first tubular element and the outer wall of the coupling sleeve is pressed into engagement with the inner wall of the second tubular element.

9. The method of claim 8 wherein the outer wall of the coupling sleeve is formed with a greater angle of taper than the inner wall of the sleeve.

10. The method of claim 9 wherein the angle of taper of the outer wall is on the order of two times the angle of taper of the inner wall.

* * * * *